US009611164B2

(12) United States Patent
Jeanvoine et al.

(10) Patent No.: US 9,611,164 B2
(45) Date of Patent: Apr. 4, 2017

(54) GLASS-MELTING INSTALLATION COMPRISING TWO FURNACES

(75) Inventors: Pierre Jeanvoine, Saint-Germain En Laye (FR); Stephane Maugendre, Precy S/Oise (FR)

(73) Assignees: SAINT-GOBAIN GLASS FRANCE, Courbevoie (FR); SAINT-GOBAIN ISOVER, Courbevoie (FR)

( * ) Notice: Subject to any disclaimer, the term of this patent is extended or adjusted under 35 U.S.C. 154(b) by 765 days.

(21) Appl. No.: 12/532,229

(22) PCT Filed: Mar. 19, 2008

(86) PCT No.: PCT/FR2008/050471
§ 371 (c)(1),
(2), (4) Date: Nov. 25, 2009

(87) PCT Pub. No.: WO2008/132373
PCT Pub. Date: Nov. 6, 2008

(65) Prior Publication Data
US 2010/0064732 A1    Mar. 18, 2010

(30) Foreign Application Priority Data
Mar. 20, 2007  (FR) ..................................... 07 53936

(51) Int. Cl.
*C03B 5/235* (2006.01)
*C03B 5/04* (2006.01)

(52) U.S. Cl.
CPC .............. *C03B 5/2356* (2013.01); *C03B 5/04* (2013.01); *C03B 2211/22* (2013.01); *Y02P 40/57* (2015.11); *Y02P 40/58* (2015.11)

(58) Field of Classification Search
USPC ........................................................ 65/121
(Continued)

(56) References Cited

U.S. PATENT DOCUMENTS 3,248,205 A * 4/1966 Dolf .............................. 65/335
4,133,666 A * 1/1979 Rhodes et al. ................. 65/101
(Continued)

FOREIGN PATENT DOCUMENTS

BE      647 182      10/1964
FR    2 832 704       5/2003
(Continued)

OTHER PUBLICATIONS

Tomik, J., "New Furnace Utilizes Glass Fiber Waste", Glass Industry, vol. 71, No. 4 pp. 23-24 (Mar. 10, 1990) XP-000115412.
(Continued)

*Primary Examiner* — John Hoffmann
(74) *Attorney, Agent, or Firm* — Oblon, McClelland, Maier & Neustadt, L.L.P.

(57) ABSTRACT

The invention relates to a process and to an installation for preparing a final glass, comprising a main furnace with electrodes and/or overhead burners, which is fed with main batch materials generating a main molten glass, and a submerged-combustion auxiliary furnace, said auxiliary furnace being fed with auxiliary batch materials, the auxiliary molten glass feeding the main furnace toward its upstream end in the first third of its length, the auxiliary glass being substantially of the same composition as the main glass. The downstream zone of the main furnace is thus used to remove both gases coming from the main glass and gases coming from the auxiliary glass, in order to finish melting the batch stones and impurities contained in the auxiliary glass and to homogenize the two glass streams from their redox standpoint, when this is necessary.

26 Claims, 1 Drawing Sheet

(58) Field of Classification Search
    IPC ............... C03B 5/2356,3/02, 2211/22, 5/04
    See application file for complete search history.

(56) References Cited

U.S. PATENT DOCUMENTS

| | | | | |
|---|---|---|---|---|
| 4,325,724 A | * | 4/1982 | Froberg | ............................ 65/474 |
| 4,409,012 A | * | 10/1983 | Miller | ...................... C03B 5/245 |
| | | | | 356/426 |
| 4,460,397 A | * | 7/1984 | Kapura et al. | .................. 65/99.5 |
| 4,528,012 A | * | 7/1985 | Sturgill | ................... C03B 5/237 |
| | | | | 432/180 |
| 4,632,687 A | * | 12/1986 | Kunkle et al. | ...................... 65/27 |
| 4,634,461 A | * | 1/1987 | Demarest et al. | ................. 65/27 |
| 5,352,258 A | * | 10/1994 | DeGreve | ................... C03B 3/00 |
| | | | | 65/134.4 |
| 2005/0039491 A1 | | 2/2005 | Maugendre et al. | |

FOREIGN PATENT DOCUMENTS

| | | |
|---|---|---|
| JP | 56 120523 | 9/1981 |
| WO | WO 99/37591 A1 | 7/1999 |
| WO | WO 03/045859 | 6/2003 |
| WO | WO 2004/078664 | 9/2004 |

OTHER PUBLICATIONS

Office Action issued Aug. 12, 2016, in Indian Patent Application No. 3267/KOLNP/2009, filed Sep. 14, 2009 (w/English translation).

\* cited by examiner

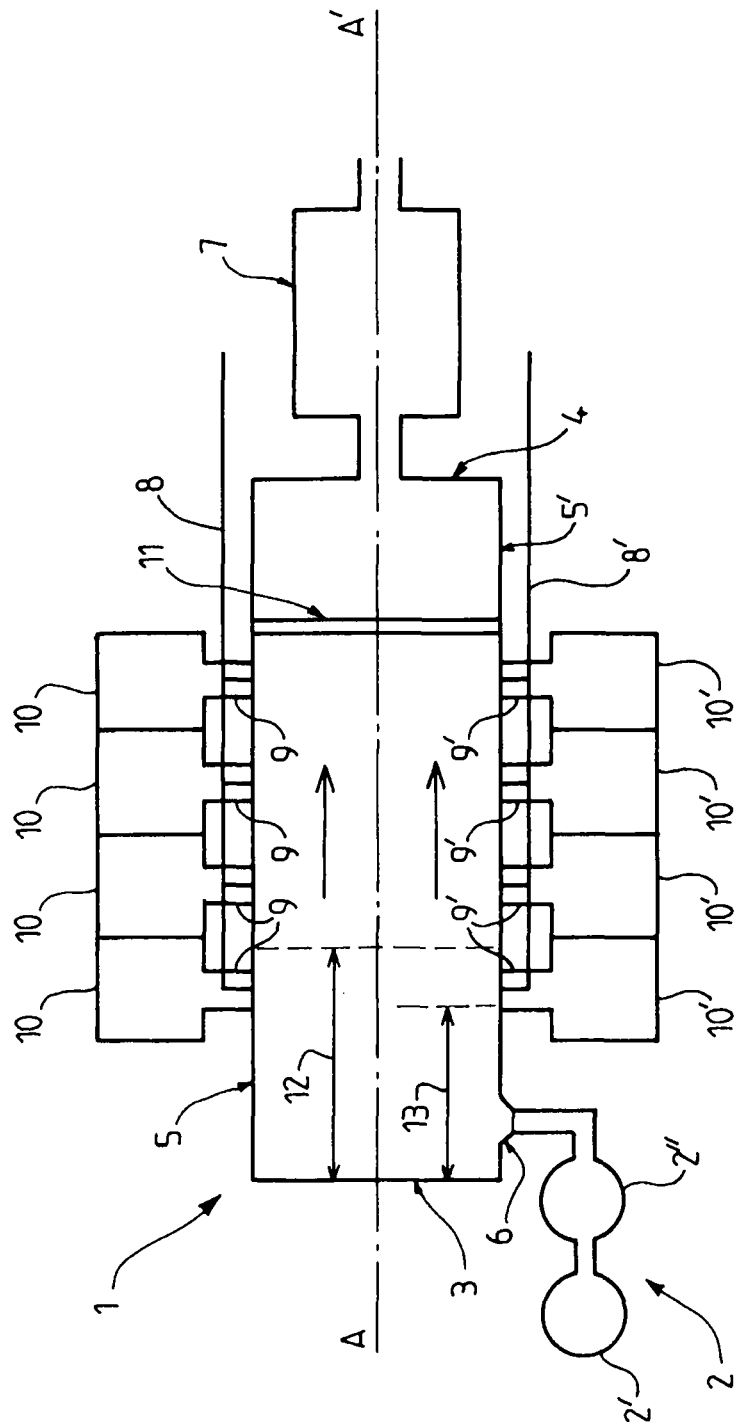

GLASS-MELTING INSTALLATION COMPRISING TWO FURNACES

CROSS REFERENCE TO RELATED APPLICATION

This application is a 371 of International Patent Application No. PCT/FR08/050471, filed on Mar. 19, 2008, and claims priority to French Patent Application No. 0753936, filed on Mar. 20, 2007.

The invention relates to an installation for melting batch materials that comprises a conventional melting furnace and a submerged-combustion furnace, the glass streams being mixed upstream of the conventional furnace.

Conventional melting furnaces are installations whose thermal energy predominantly comes from electrodes and/or overhead burners. These furnaces are of large size (the surface area of the molten glass bath may range from 6 to 600 $m^2$, and in the case of furnaces with overhead burners, more generally from 20 to 600 $m^2$) and have a high inertia. They therefore operate continuously for several years running.

In WO 2004/078664 and WO 03/045859 it has already been proposed to attach a submerged-burner furnace to one of these conventional furnaces. The glass streams, of different natures, are mixed downstream of the two furnaces, especially in a mixing cell equipped with stirrers, or else, the glass stream coming from the submerged-burner furnace directly feeds the conventional furnace in its downstream part. A refining device specifically for the glass stream coming from the submerged-burner furnace is then essential, as otherwise the final stream contains far too many bubbles and/or batch stones. This is because submerged-burner furnaces are known for producing foamy glasses that are very rich in gas and require at least two tanks in series to digest all the raw materials.

The idea has now been arrived at of introducing the glass stream coming from the submerged-combustion furnace into the conventional furnace and upstream of it, so as to benefit from the refining zone downstream of the conventional furnace for the two mixed glass streams. This is because a conventional furnace always comprises a larger or smaller refining zone in its downstream part, which helps to remove the bubbles that inevitably form during the manufacture of a glass, and also to finish "digesting" the particles that have still not melted. The idea has now been arrived at of using this downstream zone of the conventional furnace in particular for removing both gases coming from the molten batch materials of the conventional furnace and gases contained in the glass coming from the submerged-combustion furnace. It is possible that the large bubbles produced in the glass from the auxiliary furnace help to remove the small bubbles created in the glass from the main furnace via a coalescence phenomenon. Thus, in a slightly paradoxical manner, the production of more bubbles leads to a better removal of the bubbles. Furthermore, use is made of the downstream zone of the main furnace to finish melting or "digesting" the batch stones and impurities (especially metals) contained in the glass originating from the auxiliary furnace and to homogenize the two glass streams from their redox standpoint, when this is necessary.

Within the context of the present application, the conventional furnace is referred to as the "main furnace" and the submerged-combustion furnace is referred as the "auxiliary furnace". More than 50% and even more than 80% of the thermal energy provided in the main furnace is done so by means of electrodes or overhead burners or by these two means. More than 50% and even more than 80% of the thermal energy provided in the auxiliary furnace is done so by means of submerged combustion. The batch raw material introduced into the main furnace is referred to as the main batch raw material and the batch raw material introduced into the auxiliary furnace is referred to as the auxiliary batch raw material. The main batch raw material results in a main stream of a main glass and the auxiliary batch raw material results in an auxiliary stream of an auxiliary glass. These two glasses are mixed in the upstream part of the main furnace to produce a final stream of a final glass. The expression "upstream part" of the main furnace is understood to mean the first upstream third of the length of the surface of the glass batch, said length being located along the horizontal and longitudinal axis of the furnace. Generally, the main furnace has a greater length than its width, the ratio of the length to the width possibly ranging from 1.5 to 6. The terms "upstream" and "downstream" refer to the flow direction of the glass, the latter flowing from upstream to downstream. The upstream part comprises the zone for introduction of the batch materials. The downstream part comprises the zone for exiting of the final glass toward the outside of the main furnace. Preferably, the auxiliary glass runs into the main furnace via an overflow or a recess that is slightly set back relative to the side wall of the main furnace, said recess possibly comprising a protective barrier (wall that descends from the roof and slightly enters the molten glass to act as an obstacle to floating solid material) to prevent the batch material composition from flowing back into the recess. The auxiliary glass preferably runs into the main furnace as far upstream as possible, in particular, preferably into the first upstream quarter of the length of the main furnace. Thus, the risk of batch stones originating from the auxiliary glass persisting while passing through the main furnace is reduced.

Thus, the invention firstly relates to an installation for preparing a final glass, comprising a main furnace with electrodes and/or overhead burners, which is fed with main batch materials generating a main molten glass, and a submerged-combustion auxiliary furnace, said auxiliary furnace being fed with auxiliary batch materials, the auxiliary molten glass feeding the main furnace toward its upstream end in the first third of its length.

The invention more particularly has an advantage when it is desired to temporarily increase the furnace pull or output of the main furnace. This situation arises when a glass must occasionally be manufactured in a larger amount. Thus, during the continuous production of the final glass, the auxiliary furnace may not operate for as long as the main furnace whereas the operating time of the main furnace is identical to the time for producing the final glass. Thus, the operating time of the auxiliary furnace may be shorter than that of the main furnace. According to the invention, an auxiliary glass of substantially the same composition as the main glass is produced in the auxiliary furnace. The output of the final glass is the sum of the output of the main glass and the output of the auxiliary glass. The fact that the two glasses are identical removes the problem of homogenization of the glass from the chemical composition standpoint. The output of the auxiliary glass may represent more than 2% and even more than 4% of the output of the final glass. The output of the auxiliary glass may represent up to 10% and even up to 25% and even up to 40% of the output of the final glass.

The auxiliary furnace, due to its technology based on submerged combustion has an extraordinary flexibility, and a reduced size, while allowing relatively high furnace pulls.

The submerged-combustion furnace is naturally stirred by gases coming from the burners, so that the presence of mechanical stirrers is rendered pointless. The submerged-combustion furnace may comprise from 1 to 30 submerged burners depending on the required furnace pull and power. Generally, the surface of the molten glass bath of the auxiliary furnace has an area area ranging from 0.5 m$^2$ to 15 m$^2$ (sum of the internal surface areas of all the submerged-combustion tanks, generally numbering one or two, that make up the auxiliary furnace). Its output generally ranges from 2 to 150 tonnes per day.

Generally, the ratio of the surface area of the molten bath of the main furnace to that of the molten bath of the auxiliary furnace ranges from 10 to 1000.

The installation according to the invention may be followed by a plant for forming flat glass or hollow glass or a fiberizing plant.

The main furnace may be followed by a refining zone, but this is not generally necessary, the refining being carried out sufficiently in the main furnace itself, even for the flat glass application, which is remarkable. This is because, for the flat glass application, the amount of bubbles in the final glass must be less than 0.5 bubbles per liter. The final glass may therefore be intended to feed a plant for forming flat glass, especially of the type in which it floats on a bath of metal (tin). In this case, so as to give the glass the appropriate temperature (thermal conditioning generally between 1200 and 1300° C.), the final glass generally passes through a working end positioned between the main furnace and the plant for forming flat glass. The glass generally enters the plant for forming flat glass with a temperature of around 1000 to 1200° C.

When the final glass is intended to feed a fiberizing plant, no refiner nor working end nor other compartment is generally necessary between the main furnace and the fiberizing plant (direct feeding of the fiberizing plant by the final glass coming from the main furnace).

The main furnace has a size much greater than that of the auxiliary furnace, especially due to the absence of stirring. This is because the temperatures are generally too high to allow the main furnace to be equipped with mechanical stirrers, without having to face problems linked to the corrosion of these stirrers. Thus, generally, the main furnace is not equipped with a mechanical stirrer. In the main furnace, in the case of heating by overhead burners, the molten glass generally has the following temperature profile:

1300 to 1400° C. at the batch heap;
1500 to 1600° C. toward the end of the first upstream third; and
1400 to 1450° C. at the outlet of the main furnace.

The absence of stirrers in the main furnace is compensated for by a relatively large length, which promotes natural convection loops that cause stirring. The bottom of the tank of the main furnace may especially be equipped with a submerged dam to cause a convection loop. The relatively large length of the main furnace is furthermore favorable to the refining.

Thus, the invention combines two technologies having opposing but complementary advantages:
 a small very flexible auxiliary furnace equipped with strong natural stirring due to the submerged combustion, producing a glass that is homogeneous in composition but that contains lots of bubbles and, if applicable, batch stones (unmelted silica particles); and
 a large main furnace that is not very flexible and is free of mechanical stirring, but that has a sufficient surface area to produce correct homogenization (especially for the flat glass application), effective refining and removal of the batch stones, in a substantial stream of glass.

These two technologies are combined in so far as the large size of the main furnace makes it possible to easily absorb the surplus of imperfect glass (bubbles+batch stones) originating from the auxiliary furnace, this surplus making it possible, however, to increase production by 10%, or even 20% and up to 40%, in a one-off manner that may or may not be limited in time (for example, between 1 week and 15 years), which enables the flexibility of the auxiliary furnace. It is also possible to install the auxiliary furnace permanently so as to increase the productivity of an existing plant and thus to continue to use part of a conventional furnace, that is admittedly somewhat old but that may continue to operate satisfactorily.

The auxiliary furnace may be powered by energy sources of very diverse natures, which is one of the aspects of its great flexibility. The auxiliary furnace generally comprises at least one submerged burner fed by a gaseous oxidant and a fuel (especially liquid fuel oil or combustible gas). The fuel may be a hydrocarbon-based gas, hydrogen or liquid fuel oil or an alternative energy source. In particular, the auxiliary furnace may be used to recycle organic waste of very diverse natures, this waste acting as the fuel in the submerged combustion: due to the convective mixing inherent to the submerged combustion technology, this waste is continuously renewed in the vicinity of the submerged burners until complete combustion. This makes it possible to reduce, or even to stop completely, the supply of combustible gas or liquid to the burners, with a substantial energy saving. The degradation of the organic molecules may thus be complete up to the decomposition to carbon dioxide and water. Possible combustion ash is trapped in the liquid/foamy phase. This organic waste may therefore supply some, or most of or the major part or even all of the fuel required in the submerged combustion. It is therefore possible to use, directly in the reactor, the combustible capacity of the waste, regardless of the level of this capacity. The use of organic waste makes it possible to obtain a particularly economical process.

The organic waste may be of biological nature (biomass) or be derived from the agri-food industry. It may be animal meal which can no longer be consumed in at least some of the European countries, and which it is therefore necessary to destroy. It may be wood waste or paper waste from the papermaking industry. It may also be composed of organic polymers, for example polyethylene, and tire residues.

The organic waste may be accompanied by waste of mineral nature which then forms part of the batch materials. It may especially be glass/plastic composites or sand polluted by hydrocarbons (as a result of an oil spill, for example). Mention may be made of laminated glazing, for example combining at least one glass with at least one sheet of a thermoplastic or nonthermoplastic polymer, of the polyvinyl butyral (PVB) ethylene/vinyl acetate (EVA) copolymer, polyurethane (PU) or polyethylene terephthalate (PET) type. Mention may also be made of composites based on a polymer reinforced by glass fibers (or carbon fibers or any other type of reinforcing fiber), used in the automotive industry, or in boats, for example. Mention may also be made of glass/metal composites such as glazing equipped with connector components or with metallic coatings. In the latter case it is possible, very advantageously, to oxidize the various metals (especially silver) accompanying this glazing in the auxiliary furnace by acting on the more or less oxidizing nature of the submerged burner flame. The organic waste may be the origin of up to 100% (for example, 5 to 50%, or 5 to 20%) of the total submerged combustion energy generated in the auxiliary furnace. In the case where 100% of the total submerged combustion energy is generated in the auxiliary furnace, this means that only oxidant is sent through the submerged burner, the fuel of organic waste type being sent to the outside of the burner but in its vicinity. In practice, and for the startup, the submerged burner is made to operate in a standard fashion by supplying it both with an oxidant and with combustible fluid (liquid fuel oil or combustible gas), then the combustible organic matter is gradually introduced on the outside of the burner and the supply of combustible fluid to the burner is simultaneously reduced and this, where appropriate, until the supply of combustible fluid to the burner is completely stopped. The auxiliary furnace may therefore be supplied with fuel of biological matter or organic waste type, the fuel of biological matter or organic waste type possibly, in particular, contributing 5 to 100% of the total submerged combustion energy generated in the auxiliary furnace (which means that the conventional fuel of the liquid fuel oil or combustible gas type then contributes 95 to 0% of the total submerged combustion energy generated in the auxiliary furnace).

Thus, the auxiliary furnace also makes it possible to easily vary, temporarily, the type of energy source as a function of its price. Such flexibility is possible with the auxiliary furnace but is not with the main furnace. Remember that an industrial furnace such as the main furnace operates continuously for very long periods, longer than one year and possibly even exceeding 10 years and even 15 years, or even 20 years. During this operating period, there is no means of easily changing the nature of the energy source of the main furnace. On the other hand, the auxiliary furnace itself makes it possible to benefit from the temporarily advantageous price of certain combustible materials. It is possible, therefore, due to the auxiliary furnace, to modify at least one part of the nature of the fuel several times during an uninterrupted manufacture of a certain glass with a high production, greater than 500 tonnes per day and up to 1200 tonnes per day (final glass).

The oxidant of the submerged burner may be pure oxygen or air or oxygen-enriched air.

The auxiliary glass and the main glass have an identical composition. This means that the oxides contained in the main glass at more than 1 wt % (such as silica, $Na_2O$, CaO, etc.) do not vary in composition more than 1 wt % between the auxiliary glass and the main glass (in other words, any oxide present in the main glass at more than 1 wt %, is present in the main glass and in the auxiliary glass at contents such that the difference in its weight percentage in these two glasses is not greater than 1% of its content in the main glass).

The auxiliary glass and the main glass are identical, but the raw materials supplying, on the one hand, the auxiliary furnace and, on the other hand, the main furnace may be different. In fact, the batch raw materials (sand that is a source of silica, alkali metal oxide, calcium oxide, etc.) supplying both furnaces are generally identical and come from the same lots. However, the combustible materials supplying both furnaces may be different. In particular, alternative organic materials (biological matter or organic waste) may supply the auxiliary furnace (and not supply the main furnace) and be the origin of ash or inorganic residues assimilated into the glass. These residues are, however, of a nature and in a proportion such that it does not go against the principle of the similarity of composition of the two glasses (auxiliary and main) within the meaning already given.

The two furnaces are generally supplied with conventional batch materials that are in the form of a powder, and where appropriate, partially as cullet. The amount of cullet may, for example, represent 5 to 25% of the weight of the raw materials supplying them. In the case of the availability of a cullet polluted by metals (especially silver) and organic matter, this polluted cullet is preferably fed into the auxiliary furnace (since the auxiliary furnace makes it possible to more easily oxidize the metals and the carbon), whereas the unpolluted cullet is preferably fed into the main furnace.

In the case of using a fuel that is particularly rich in carbon in the auxiliary furnace, it is possible that the iron is more reduced in the auxiliary glass than in the main glass. The oxidation state of the iron is usually characterized by a person skilled in the art by what is known as the redox. The "redox" is the ratio of the amount of $Fe^{2+}$ ions to the total amount of iron ions).

In some cases, too large a difference in the redox between the two glasses is harmful as it is a source of gas when the two glasses meet each other. This especially creates a problem when the glass must be well and truly freed of its bubbles as in the flat glass application. In this case, it is sought that the redox difference of the two glasses (auxiliary and main) does not exceed 20% of the lowest redox. If, on exiting the auxiliary furnace, the redox is too different from that of the main glass, it is preferred to pass the auxiliary glass into a second tank comprising at least one submerged burner in order to readjust its redox, before sending it into the main furnace. The adjustment of the redox is carried out in this tank by acting on the more oxidizing or less oxidizing character of the submerged burner flame.

When the glass is intended for the fiberizing application, a large difference in redox is generally tolerated.

It is not excluded to place a refiner between the auxiliary furnace and the main furnace, in the path of the auxiliary glass. In this case, the auxiliary glass is at least partially refined before entering into the main furnace, and the refining is continued downstream of the main furnace. The auxiliary furnace may therefore comprise one or two submerged combustion tanks (the second possibly acting, in particular, to adjust the redox), placed one after the other in the path of the auxiliary glass, and followed by a refiner. However, it is not generally necessary to resort to such a refiner for the auxiliary glass as the refining provided by the main furnace generally suffices for refining the two mixed glasses.

When the main furnace is equipped with overhead burners, it is generally also equipped with regenerators. These regenerators contain stacks of refractory elements intended to alternately be heated by the flue gases, then to release the heat recovered from the flue gases to the oxidant, generally air. Generally, the overhead burners are located in rows in the two side walls. The side walls are also each equipped with orifices for evacuating the flue gases, that lead to the regenerators. Each row of burners from one wall are operated alternately from which the flue gases are recovered through the orifices of the wall opposite them, the heat of said flue gases being recovered by the corresponding regenerators. After a certain operating time, the operation between the two side walls is reversed, the oxidant now being heated by the regenerators which were themselves passed through by the flue gases in the preceding step.

The main furnace may also be of the unit-melter type, that is to say equipped with transverse overhead burners, the heat of the flue gases then being recovered in a recuperator, generally placed behind the upstream wall.

In the case where the main furnace is equipped with overhead burners, advantageously the flue gases from the auxiliary furnace are conveyed to the atmosphere of the main furnace. The flue gases from both furnaces are therefore mixed in the atmosphere of the main furnace.

In that way, the heat from the flue gases of the auxiliary furnace is recovered in the regenerators or the recuperator of the main furnace, in the same way as the flue gases from the main furnace.

It is also possible to use the flue gases to reheat the raw materials (powder and/or cullet) feeding one or both furnaces.

Finally, the heat from the flue gases of the auxiliary furnace may also be used to produce oxygen, for example according to the OTM (oxygen transport membrane) technology, said oxygen being used as an oxidant for the auxiliary furnace and/or the main furnace.

The invention also relates to a process for manufacturing flat glass that comprises the process for manufacturing final glass explained above, said final glass then being converted to flat glass, generally in a plant in which it floats on a bath of molten metal. The width of the bath of molten metal may be greater than 2 meters.

The invention also relates to a process for manufacturing glass fibers that comprises the process for manufacturing final glass explained above, said final glass then being converted to glass fibers in a fiberizing unit. In particular, the final glass may not pass into any compartment between the main furnace and the fiberizing unit.

FIG. 1 represents an example of an installation according to the invention comprising a main furnace 1 and an auxiliary furnace 2 that comprises at least one submerged burner. The main furnace comprises an upstream wall 3, a downstream wall 4 and two side walls 5 and 5'. The batch materials are introduced from the upstream wall 3 via a standard device that is not shown. The main furnace is symmetrical about the axis AA' which is horizontal and parallel to the longitudinal direction of the furnace. The molten batch materials flow from upstream to downstream as shown by the arrows. The auxiliary furnace 2 here comprises two tanks 2' and 2" in series, the first one 2' being fed by the batch materials and the second one 2" being used to adjust the redox. The auxiliary furnace 2 delivers the auxiliary glass upstream of the main furnace through the recess 6. This recess 6 is located upstream in the first third 12 and even in the first quarter 13 of the length of the glass bath in the main furnace. The final glass passes into a working end 7 for thermal conditioning purposes before going into the conversion unit that is not shown and which may be a float glass plant for producing flat glass. The main furnace is equipped, through both its side walls, with two rows of four overhead burners that operate one after the other. Each overhead burner comprises a combustible gas injector supplied with gas by the ducts 8 and 8', and a hot air inlet 9 and 9'. The openings 9 and 9' alternately act as a hot air inlet and a flue gas collector. For each injector/air inlet pair, the injector is located below the air inlet. The openings 9 and 9' are each connected to a regenerator 10, 10'. When the injectors from wall 5 operate, those of wall 5' do not operate. On the other hand, the flue gases pass through the openings 9' of the side wall 5' opposite them and the heat of the flue gases is recovered in the regenerators 10. After a few tens of minutes, the operation of the main furnace is reversed, that is to say that the operation of the burners from wall 5 is stopped (stopping combustible gas through the duct 8 and stopping air through the openings 9) and the overhead burners from wall 5' opposite are started up, feeding its gas injectors via the duct 5' and supplying the air inlets 9' with hot air. The air is hot due to being heated by the regenerators 10. After a few tens of minutes, the operation of the furnace is again reversed, and so forth. The main furnace is equipped with a submerged dam 11 that promotes the formation of convection loops in the molten glass.

The invention claimed is:

1. A process for manufacturing a final glass product comprising:
   producing an auxiliary molten glass by melting auxiliary batch materials in an auxiliary furnace having submerged burners,
   feeding main batch materials comprising a powder or a cullet into a main furnace having electrodes or overhead burners, or both,
   providing thermal energy in the auxiliary furnace with the submerged burners,
   providing thermal energy in the main furnace, wherein more than 80% of the thermal energy provided in the main furnace is provided by electrodes and/or overhead burners,
   melting said main batch materials in said main furnace to produce a molten glass bath in the main furnace,
   feeding the auxiliary molten glass into an upstream portion of the main furnace, the upstream portion being in a first upstream third of a length of a surface of the molten glass bath in the main furnace, and
   generating a final glass product from the auxiliary molten glass and main batch materials in the main furnace.

2. The process as claimed in claim 1, wherein an operating time for generating a final glass product from the auxiliary molten glass and main batch materials in the main furnace is for a longer period of time than producing an auxiliary molten glass from auxiliary batch materials in an auxiliary furnace having submerged burners.

3. The process as claimed in claim 1, wherein an output of auxiliary glass is 2% to 40% of an output of the final glass product.

4. The process as claimed in claim 3, wherein an output of auxiliary glass is 4% to 25% of an output of the final glass product.

5. The process as claimed in claim 1, further comprising feeding the burners in the auxiliary furnace with fuel comprising at least one recycled waste material selected from the group consisting of biomass waste, agri-food industry waste, wood waste, paper waste, and organic polymer waste.

6. The process as claimed in claim 5, further comprising generating submerged-combustion energy in the auxiliary furnace, wherein the fuel comprising at least one recycled waste material accounts for 5% to 100% of submerged-combustion energy generated in the auxiliary furnace.

7. The process as claimed in claim 1, wherein, when the main batch materials in the main furnace are molten, oxide is present in the molten main batch materials in the main furnace and in the auxiliary molten glass such that the difference in its weight percentage in the molten main batch materials in the main furnace and the auxiliary molten glass is not greater than 1%.

8. The process as claimed in claim 1, wherein the auxiliary furnace comprises at least one flue gas collector and the main furnace comprises at least one regenerator, and at least one flue gas is conveyed from the flue gas collector to the regenerator.

9. The process as claimed in claim 1, further comprising converting the final glass product into flat glass.

10. The process as claimed in claim 9, wherein, when the main batch materials in the main furnace are molten, a difference in redox of the auxiliary molten glass and the molten main batch materials in the main furnace does not exceed 20%.

11. The process as claimed in claim 9, further comprising converting the final glass product to flat glass in a plant in which it floats on a bath of molten metal, a width of which is greater than 2 meters.

12. A process for manufacturing glass fibers that comprises the process for manufacturing glass from claim 1, said glass then being converted to glass fibers in a fiberizing unit.

13. The process as claimed in claim 12, wherein the glass does not pass into any compartment between the main furnace and the fiberizing unit.

14. The process as claimed in claim 1, wherein the main furnace is free of mechanical stirring.

15. The process as claimed in claim 1, wherein a ratio of a surface area of a molten bath of the main furnace to that of a molten bath of the auxiliary furnace ranges from 10 to 1000.

16. The process as claimed in claim 1, wherein the composition of said main batch materials is different from the composition of said auxiliary batch materials.

17. The process as claimed in claim 16, wherein said auxiliary batch materials comprise organic materials and said main batch materials are free of organic materials.

18. The process as claimed in claim 1, wherein said main furnace is symmetrical about a longitudinal axis of the main furnace.

19. The process as claimed in claim 1, wherein said auxiliary furnace comprises two tanks in series.

20. A process for manufacturing a final glass product comprising:
producing an auxiliary molten glass by melting auxiliary batch materials in an auxiliary furnace having submerged burners,
feeding main batch materials comprising a powder or a cullet into a main furnace having electrodes or overhead burners, or both,
providing thermal energy in the auxiliary furnace with the submerged burners,
providing thermal energy in the main furnace, wherein more than 50% of the thermal energy provided in the main furnace is provided by electrodes and/or overhead burners,
melting said main batch materials in said main furnace to produce a molten glass bath in the main furnace,
feeding a feed consisting of the auxiliary molten glass into an upstream portion of the main furnace, the upstream portion being in a first upstream third of a length of a surface of the molten glass bath in the main furnace, and
generating a final glass product from the auxiliary molten glass and main batch materials in the main furnace.

21. The process as claimed in claim 20, wherein a ratio of a surface area of a molten bath of the main furnace to that of a molten bath of the auxiliary furnace ranges from 10 to 1000.

22. The process as claimed in claim 20, wherein an output of auxiliary glass is 2% to 40% of an output of the final glass product.

23. A process for manufacturing a final glass product comprising:
producing an auxiliary molten glass by melting auxiliary batch materials in an auxiliary furnace having submerged burners,
feeding main batch materials comprising a powder or a cullet into a main furnace having electrodes or overhead burners, or both,
providing thermal energy in the auxiliary furnace with the submerged burners,
providing thermal energy in the main furnace, wherein more than 50% of the thermal energy provided in the main furnace is provided by electrodes and/or overhead burners,
melting the main batch materials in the main furnace to produce a molten glass bath in the main furnace,
feeding the auxiliary molten glass into an upstream portion of the main furnace, the upstream portion being in a first upstream third of a length of a surface of the molten glass bath in the main furnace, and
generating a final glass product from the auxiliary molten glass and main batch materials in the main furnace,
wherein an output of auxiliary glass is 2% to 40% of an output of the main furnace.

24. The process as claimed in claim 23, wherein the electrodes and/or overhead burners provide more than 80% of thermal energy provided in the main furnace.

25. The process as claimed in claim 23, wherein the main furnace is free of mechanical stirring.

26. The process as claimed in claim 23, wherein a ratio of a surface area of a molten bath of the main furnace to that of a molten bath of the auxiliary furnace ranges from 10 to 1000.

* * * * *